April 1, 1969   O. G. LELLEP ET AL   3,436,060
DEVICE FOR THE PERIODIC DELIVERY OF PREHEATED MATERIAL
Filed June 21, 1967
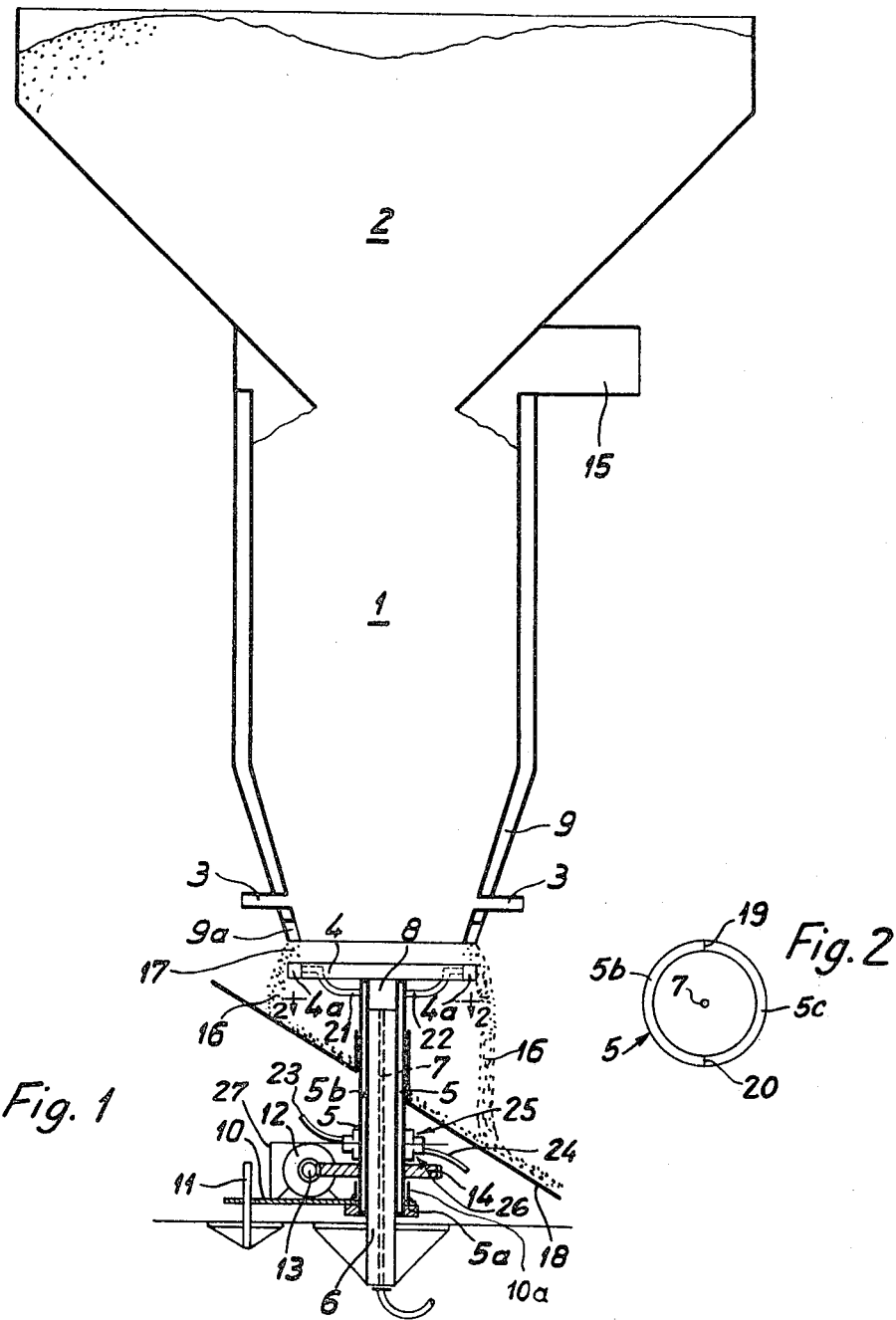

United States Patent Office 3,436,060
Patented Apr. 1, 1969

3,436,060
DEVICE FOR THE PERIODIC DELIVERY
OF PREHEATED MATERIAL
Otto George Lellep, La Masea, Calif., and Bernd Helming, Neubeckum, Germany, assignors to Polysius G.m.b.H., Neubeckum, Germany
Filed June 21, 1967, Ser. No. 647,865
Claims priority, application Germany, July 7, 1966, P 39,893
Int. Cl. F27b 1/00; B66c 17/08
U.S. Cl. 263—29       3 Claims

ABSTRACT OF THE DISCLOSURE

A device for the periodic delivery of preheated material comprising a kiln having a lower portion which is provided with a burner for heating material in the kiln and which has a bottom opening, a closure for such opening which is slidably and rotatably mounted on a substantially vertical axis, and driving mechanism for simultaneously lowering and rotating the closure to form an annular discharge aperture between the closure and the bottom opening of the kiln, including a support tube fixed to the lower side of the closure, and a vertical fixed column on which the support tube is slidable and which is provided with a channel for feeding a fluid under pressure to the space inside the support tube between the upper end of the column and the lower side of the closure.

Background of the invention

This invention relates to a device for the periodic delivery of preheated material, especially quicklime for adding to a steel converter.

In the preparation and treatment of raw material a specific quantity of matter must frequently be first highly preheated and then removed in measured quantity from the preheating device in a very short period. Such a case arises for instance with the preheating of quicklime for addition to a steel converter.

To increase the profitability of converter operation, it is known that preheating of the quicklime needed as an additive has long been considered. In view of the periodic operation of steel converters, the corresponding quicklime preheater must preferably operate periodically also. In minimizing dead time and heat losses it is important that the preheater can be emptied into the converter very rapidly (within a few minutes) but with precise measurement.

It has been proposed to preheat the quicklime by using transportable containers through which flow hot waste gases from the converter. In view of the great amounts of quicklime needed for large modern converters, and of the necessity for rapid but also precisely measured emptying of the preheater, this known system with transportable containers requires relatively complicated and expensive transport and emptying means.

The heating on a traveling grate of quicklime needed for a steel converter has already been proposed. Considerable space is however required for this solution. Also a traveling grate is relatively poorly adapted for periodic operation with rapid removal of a large amount of uniformly heated material.

In the agglomerating and sintering of material it is also known to use a rotary burner plate, with a shaft-like silo disposed above it for supplying the unfired material. Heating is by means of fuel gases which flow through the plate from below. Fired material is removed from the rotating burner plate by a scraper, while fresh material falls from the silo onto the plate. In this known device a permanently open gap exists between the lower edge of the silo and the burner plate.

A serious disadvantage of this known device lies in the heavy slagging of the burner plate through the fuel gases coming into contact with the plate in their hottest condition. A further defect lies in the lack of sealing between the burner plate and the lower edge of the shaft-like silo, which means that a very considerable part of the heating gas emerges here and hence does not help in preheating the material in the silo. Finally this known device is not applicable for the purpose met by the invention, since it does not allow sufficiently rapid emptying of a large quantity of material.

Summary of the invention

The object of the invention is thus to avoid the defects of known constructions in providing a simply constructed device with low wear and space requirement, enabling an amount of material to be highly preheated, in periodic operation, and then removed very rapidly in measured quantity.

According to the invention this object is achieved in that the device comprises a kiln provided with burners in its lower portion, the base being lowerable and simultaneously rotatable to form an annular extraction aperture, and raisable to reform a sealed lower kiln closure.

The sealed kiln base closure present with the device of the invention during the firing process permits use of a high speed frame embracing the whole kiln cross-section without loss of hot gas, thus providing very fast and uniform preheating of the material.

The rotary movement of the base provided with the device of the invention during the emptying process considerably reduces friction present in the superimposed column of material, prevents bridging and facilitates rapid removal of material. The annular extraction gap present between the base and the lower edge of the kiln wall during the emptying process, and which uniformly grows as the base descends, also enables the column of material to drop very uniformly over the entire kiln cross-section.

With the device of the invention the emptying process can be very precisely controlled as to speed and quantity. For this purpose the rotary speed of the base, its speeds of ascent and descent, the depth to which the base descends (and hence the size of the annular exit aperture in the final condition), together with the duration of rotary movement in the lowered position, can all be varied independently.

With the device of the invention material can be heated very considerably with an excellent thermal efficiency (up to 75%), and periodically extracted extremely rapidly in precise quantities. The device is relatively simple in construction and only occupies a small space. Wear, especially slagging of the base, is slight, since the burners are disposed a certain distance above the base.

Brief description of the drawing

FIG. 1 is a diagrammatic vertical section of a device embodying the invention.

FIG. 2 is a fragmentary horizontal section on a slightly larger scale, taken on the line 2—2 of FIG. 1.

Description of the preferred embodiment

The device which serves for periodic preheating of material, especially of quicklime for addition to a steel converter, comprises a kiln 1 disposed below a silo 2. In its lower portion the kiln contains burners 3, whose high speed flame extends to the kiln centre.

The kiln 1 is provided with a bottom opening having a closure in the form of a base 4 which is mounted on a support tube 5 slidably and rotatably mounted on a fixed vertical guide column 6. This guide column 6 is provided with a channel 7 through which a hydraulic or pneumatic pressure medium can be introduced into a pressure chamber 8 disposed between the upper end surface of guide column 6 and the underside of base 4. Base 4 of kiln 1 can thus be made to rise or fall relative to the fixed kiln wall 9 by controlling the pressure inside pressure chamber 8.

On the lower sealing flange 5a of support tube 5 loosely rests a platform 10 taken by support tube 5 during its ascending or descending movements, but prevented from rotating by a fixed guide rail 11. Support tube 5 can thus rotate within platform 10, which for this purpose is provided with a bearing bush 10a.

On platform 10 is disposed a motor 12 which by means of worm 13 drives a cog 14 mounted on support tube 5. This tube and base 4 connected thereto can consequently be rotated by motor 12.

The lower edge of the kiln wall 9 and the outer zone of the base form facing sealing surfaces to provide a sealed bottom closure for the kiln in the raised position of base 4. These sealing surfaces are preferably provided with jackets 4a and 9a for cooling fluid. Cooling fluid is supplied to the jacket 9a through a supply line and is discharged from the jacket 9a through a discharge line, which lines are not shown in the drawing. To feed cooling fluid to and from the jacket 4a of base 4, the support tube 5 is made double-walled, the space between the two walls being divided by two vertical partitions 19 and 20 into two channels 5b and 5c, one of which serves to supply and the other to remove cooling fluid. Two lines 21 and 22 for conducting cooling fluid connect the jacket 4a at one side to one channel 5b, and connect the jacket 4a at the other side to the other channel 5c. In order to connect the two channels 5b and 5c to a discharge line 23 and a supply line 24 for cooling fluid two conventional annular fluid couplings 25 and 26 are provided on the periphery of the rotatable support tube 5 to supply and remove cooling fluid. The stationary halves of these rotary fluid couplings are mounted on opposite sides of a horizontal support plate 27 which is secured upon the platform 10, and are connected to the supply line 24 and to the discharge line 23 respectively. The rotatable half of each of the rotary couplings is secured on the periphery of the support tube 5, one of these halves being connected to one channel 5b and the other rotary coupling half being connected to the other channel 5c through a slot in the wall of the support tube 5.

The device in accordance with the invention operates as follows:

When base 4 is in its raised position, the outer zone of base 4 lies against the lower edge of kiln wall 9, so that kiln 1 is closed at the bottom. Burners 3, preferably supplied with atomized liquid fuel mixed with air under pressure, produce a flame extending to the kiln centre, and bring the material located in this lower region of the kiln to the desired final temperature. The hot gases then flow upward through kiln 1 and are removed through a vent 15.

If a specific amount of reheated material is now to be removed from kiln 1, base 4 is lowered by reducing the pressure of the medium supplied to chamber 8. At the same time motor 12 is switched on so that base 4 moves in rotation. Material 16 is consequently expelled uniformly around the whole periphery of the annular exit aperture 17 now formed and increasing as base 4 descends: the rotary movement of base 4 ensures that the column of material loaded thereon slides down quite uniformly within the kiln 1. If the device of the invention is used to preheat quicklime for addition to a steel converter, the expelled material 16 slides down the chute 18 directly into the converter mouth. When the amount of material extracted is approaching the desired quantity, base 4 is again raised by increasing the pressure of the medium supplied to chamber 8. Motor 12 remains switched on, so that base 4 continues its rotary motion. In this way attainment of the sealed position (raised position of base 4) is facilitated, since particles of material located in the now reducing exit aperture 17 are crushed by the relative movement between the sealing surfaces.

When base 4 has returned to its upper position, wherein kiln 1 is closed at its lower end, motor 12 is stopped. Preferably the burners 3 are supplied with a mixture of atomized liquid fuel and air under pressure through a common supply line containing a plug valve the operating arm of which is normally horizontal when the plug valve is open and the base 4 is in its raised position. A link is pivoted at one end to the extremity of the operating arm of the plug valve and at the other end to the platform 10, so that as soon as the platform 10 and the base 4 begin to descend from their raised positions, the plug valve is closed to shut off the supply of fuel to the burners 3. Then when the base 4 is returned to its upper position, the burners 3, whose fuel supply has been interrupted during the described emptying process, are now switched on again, and a new heating cycle begins.

What is claimed is:

1. A device for the periodic delivery of preheated material, wherein the improvement comprises a kiln having a lower portion which is provided with a burner for heating material in the kiln and which has a bottom opening; a closure for such opening which is slidably and rotatably mounted on a substantially vertical axis; and driving mechanism for simultaneously lowering and rotating such closure, to form an annular discharge aperture between the closure and the bottom opening of the kiln, said driving mechanism comprising apparatus for translating the closure along its axis of rotation, including a support tube which is fixed to the lower side of the closure and is slidable upon a substantially vertical fixed guide column that is provided with a channel for feeding a fluid under pressure to the space inside the support tube between the upper end of the guide column and the lower side of the closure.

2. A device according to claim 1 wherein the driving mechanism comprises apparatus for rotating the closure, including a platform rotatably supported on the support tube, a fixed guide slidably engaging the platform to prevent the platform from rotating with the support tube, and a motor mounted on the platform for rotating the support tube.

3. A device according to claim 1 wherein the support tube is double-walled and the space between the two walls is divided by two vertical partitions into two channels, and the peripheral portion of the closure comprises a jacket for cooling fluid, one of said channels being connected by a rotary fluid coupling to a supply line and being connected by another line to one portion of said jacket, and the other channel being connected by a rotary fluid coupling to a discharge line and being connected by another line to another portion of said jacket.

References Cited

UNITED STATES PATENTS

| 1,152,050 | 8/1915 | Roitzheim | 263—29 |
| 1,932,388 | 10/1933 | Weaton | 263—29 |
| 3,358,976 | 12/1967 | Siktberg | 263—29 |

JOHN J. CAMBY, *Primary Examiner.*

U.S. Cl. X.R.

214—18